US007101126B2

(12) United States Patent
Kakino et al.

(10) Patent No.: US 7,101,126 B2
(45) Date of Patent: Sep. 5, 2006

(54) CUTTING FORCE DETECTION METHOD AND MACHINING CONTROL METHOD AND APPARATUS BASED ON DETECTED CUTTING FORCE

(75) Inventors: Yoshiaki Kakino, 256-5, Iwakura-hanazono-cho, Sakyo-ku, Kyoto-shi, Kyoto, 606-0024 (JP); Iwao Yamaji, Hikone (JP); Hideaki Inoue, Tsuru (JP); Koji Matsuoka, Yamatokoriyama (JP); Hirotoshi Otsuka, Oita (JP); Hisashi Otsubo, Okayama (JP); Heisaburo Nakagawa, A-303, 1700, Kaideima-cho, Hikone-shi, Shiga, 522-0056 (JP); Masakazu Tabata, Chiba (JP)

(73) Assignees: Yoshiaki Kakino, Kyoto (JP); Heisaburo Nakagawa, Shiga (JP); Fanuc LTD, Yamanashi (JP); Yasuda Precision Tools K.K., Okayama (JP); Mori Seiki Co., Ltd., Nara (JP); Manufacturing Technology Institute Inc., Chiba (JP)

( * ) Notice: Subject to any disclaimer, the term of this patent is extended or adjusted under 35 U.S.C. 154(b) by 294 days.

(21) Appl. No.: 10/834,372

(22) Filed: Apr. 29, 2004

(65) Prior Publication Data
US 2004/0258495 A1 Dec. 23, 2004

(30) Foreign Application Priority Data
May 8, 2003 (JP) ............................. 2003-130466

(51) Int. Cl.
*B23Q 15/00* (2006.01)
(52) U.S. Cl. ...................... 409/84; 409/80; 409/187; 700/170

(58) Field of Classification Search ............ 409/79–80, 409/84, 132, 186–187, 193, 194, 207; 408/8–11; 700/170, 159, 174, 177; 702/41, 44, 64; 318/490, 438, 565, 569–571, 635, 650
See application file for complete search history.

(56) References Cited

U.S. PATENT DOCUMENTS 3,846,688 A * 11/1974 Perloff ...................... 318/565

(Continued)

FOREIGN PATENT DOCUMENTS

DE 2931940 A1 * 2/1981

(Continued)

*Primary Examiner*—Erica Cadugan
(74) *Attorney, Agent, or Firm*—Staas & Halsey LLP

(57) ABSTRACT

End-mill machining control method and apparatus in which cutting forces tangential and normal to tool motion are detected and machining is controlled based on the detected cutting force values. A primary component Ft and motion axis components Fx, Fy of a cutting force are determined from current values of a spindle motor and motion axis motors for tool feed. A cutting-engaged angle αen is determined from a radius R of a tool and a depth of cut I into a workpiece. A motion direction angle β is determined from distribution motion amounts ΔX, ΔY to the axes. The cutting forces Fm, Fs tangential and normal to tool motion are determined from the primary component Ft and a motion axis component Fx or Fy whichever is the largest, the cutting-engaged angle αen, the motion direction angle β. The accuracy of the determined cutting forces Fm, Fs is high since they are determined from the primary component Ft less affected by disturbance and the largest axis component of the cutting force. By controlling the cutting forces Fm, Fs tangential and normal to the tool motion, machining accuracy can be improved and tool life can be extended.

17 Claims, 8 Drawing Sheets

αen: CUTTING-ENGAGED ANGLE (RADIAN)
β: MOTION DIRECTION ANGLE (FROM 0 TO 2π RADIAN)
γ: CUTTING-POINT ANGLE (RADIAN)
Fx, Fy: CUTTING FORCE COMPONENT IN AXIAL DIRECTIONS OF X-Y COORDINATE SYSTEM
Ft: CUTTING FORCE IN SPINDLE ROTATION DIRECTION (PRIMARY COMPONENT)
Fn: CUTTING FORCE IN DIRECTION NORMAL TO SPINDLE ROTATION DIRECTION (THRUST COMPONENT)
Fm: CUTTING FORCE IN TOOL MOTION DIRECTION
Fs: CUTTING FORCE IN DIRECTION NORMAL TO TOOL MOTION DIRECTION
R: TOOL RADIUS
I: DEPTH OF CUT
F: CUTTING FORCE VECTOR

U.S. PATENT DOCUMENTS

| | | | | |
|---|---|---|---|---|
| 4,984,490 | A * | 1/1991 | Kurki | 83/13 |
| 5,211,060 | A * | 5/1993 | O'Brien et al. | 73/862.044 |
| 6,344,724 | B1 * | 2/2002 | Kakino et al. | 318/570 |
| 6,384,560 | B1 * | 5/2002 | Kakino et al. | 700/175 |
| 6,501,997 | B1 * | 12/2002 | Kakino | 700/159 |
| 6,739,947 | B1 * | 5/2004 | Molnar | 451/8 |
| 6,824,336 | B1 * | 11/2004 | Izutsu et al. | 409/84 |
| 6,836,697 | B1 * | 12/2004 | Isakov | 700/159 |
| 6,886,435 | B1 * | 5/2005 | Feist | 82/1.11 |
| 6,937,942 | B1 * | 8/2005 | Lee | 318/569 |
| 6,942,436 | B1 * | 9/2005 | Kakino et al. | 409/84 |

FOREIGN PATENT DOCUMENTS

| | | | |
|---|---|---|---|
| JP | 5-116056 | A * | 5/1993 |
| JP | 7-051976 | | 2/1995 |
| JP | 8-323585 | | 12/1996 |
| JP | 9-076144 | | 3/1997 |

* cited by examiner

FIG. 4

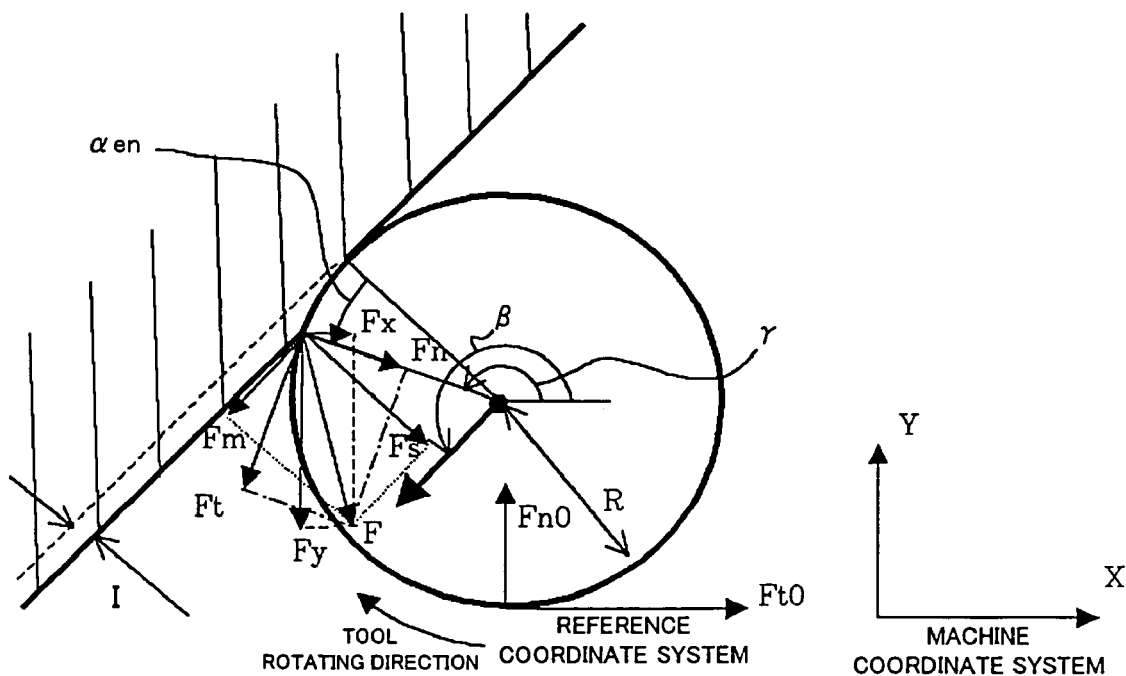

α en: CUTTING-ENGAGED ANGLE (RADIAN)

β: MOTION DIRECTION ANGLE (FROM 0 TO $2\pi$ RADIAN)

γ: CUTTING-POINT ANGLE (RADIAN)

Fx, Fy: CUTTING FORCE COMPONENT IN AXIAL DIRECTIONS OF X-Y COORDINATE SYSTEM

Ft: CUTTING FORCE IN SPINDLE ROTATION DIRECTION (PRIMARY COMPONENT)

Fn: CUTTING FORCE IN DIRECTION NORMAL TO SPINDLE ROTATION DIRECTION (THRUST COMPONENT)

Fm: CUTTING FORCE IN TOOL MOTION DIRECTION

Fs: CUTTING FORCE IN DIRECTION NORMAL TO TOOL MOTION DIRECTION

R: TOOL RADIUS

I: DEPTH OF CUT

F: CUTTING FORCE VECTOR

FIG. 7

| MACHINING TYPE | FEED SPEED (mm/min) | CUTTING DEPTH (l: mm) | AXIAL COMPONENT OF CUTTING FORCE MEASURED BY DYNAMOMETER | | DATA PROCESSING | | | | | TORQUE VALUE MEASURED BY CYNAMOMETER (CUTTING FORCE VALUE) | CUTTING FORCE VALUE DERIVED FROM SPINDLE MOTOR CURRENT Ft (Nm) |
|---|---|---|---|---|---|---|---|---|---|---|---|
| | | | Fdx (N) | Fdy (N) | CUTTING ENGAGED ANGLE α en (RADIAN) | Fdt (N) | β (RADIAN) | γ (RADIAN) | | Fdt*R (Nm) | |
| FIRST MACHINING | 5000 | 0.1 | −75 | −180 | 0.2003 | 109.32 | 3.1416 | 1.7711 | | 0.55 | 0.60 |
| | 5000 | 0.3 | −200 | −400 | 0.3282 | 324.47 | 3.1416 | 1.9190 | | 1.62 | 1.27 |
| | 5000 | 0.5 | −200 | −600 | 0.4510 | 441.54 | 3.1416 | 2.0218 | | 2.21 | 1.96 |
| | 1000 | 0.5 | −50 | −350 | 0.4510 | 197.56 | 3.1416 | 2.0218 | | 0.99 | 1.01 |
| | 2500 | 0.5 | −100 | −500 | 0.4510 | 307.95 | 3.1416 | 2.0218 | | 1.54 | 1.58 |
| | 5000 | 0.5 | −200 | −650 | 0.4510 | 463.33 | 3.1416 | 2.0218 | | 2.32 | 2.37 |
| SECOND MACHINING | 5000 | 0.1 | 100 | −200 | 0.2003 | 111.53 | 3.9270 | 2.5566 | | 0.56 | 0.88 |
| | 5000 | 0.3 | 150 | −400 | 0.3282 | 298.91 | 3.9270 | 2.7045 | | 1.49 | 1.39 |
| | 5000 | 0.5 | 300 | −600 | 0.4510 | 468.43 | 3.9270 | 2.8075 | | 2.34 | 2.16 |

CUTTING FORCE DETECTION METHOD AND MACHINING CONTROL METHOD AND APPARATUS BASED ON DETECTED CUTTING FORCE

BACKGROUND OF THE INVENTION

1. Field of the Invention

The present invention relates to a machine tool, and more particularly, to detection of a cutting force, and control method and apparatus based on use of the detected cutting force.

2. Description of Related Art

Known in machine tools are a detection method in which load on a main spindle or a motion axis is monitored to detect abnormal machining, tool wear, tool life, etc., a cutting control method in which deceleration control of feed speed of a motion axis is made based on a detected load, and a control method in which an alarm output and a machine stop ate effected when a detected load exceeds a preset reference value (see for example, JP 9-76144A).

For load detection, a known method detects a driving current of a main spindle motor or a motion axis motor and determines load based on the detected driving current (see for example, JP 8-323585A). Also known is a method in which a load torque is estimated by a disturbance observer that is installed in a control system for a main spindle motor or a motion axis motor (JP 9-76144A and JP 7-51976A).

Also in end-mill machining, a cutting force can be monitored during the machining to carry out various controls such as tool wear detection, adaptive control to enhance the machining accuracy and efficiency, whereby improved machining can be realized. In end milling, however, a small cutting force in the order of several tens of N must be monitored. With recently developed digital control techniques, it becomes possible to monitor a considerably small cutting force based on a value of spindle motor current, but still impossible to separately detect cutting forces exerted in the directions tangential and normal to the tool motion that are important for control of the end milling process. Separate monitoring of the tangential and normal cutting forces based on driving currents of motion axis motors for tool feed is also quite difficult in machine tools such as a general machining center. This is because of the presence of frictional resistance generated in a guide and ball screw system for relative motion of a workpiece and a tool, which resistance is in the order of several hundreds of N and constitutes disturbance. Aside from an axis which is large in motion amount, it is therefore extremely difficult to detect a small cutting force acting in the direction of an axis, which is small in motion amount, on the basis of a value of driving current of a motion axis motor concerned.

SUMMARY OF THE INVENTION

The present invention provides detection of cutting force in end-mill machining, which uses a current value of a spindle motor in combination with current values of motion axis motors, and provides a detected cutting force-based machining control method and apparatus.

According to the present invention, there is provided a cutting force detection method for machining by an end mill tool, comprising the steps of: detecting a current value of a spindle motor and current values of motion-axis motors for cutting feed; and determining a cutting force component in a direction tangential to tool motion and/or a cutting force component in a direction normal to tool motion using the detected current values of the spindle motor and the motion-axis motors, and a radius and a cutting-engaged angle of the end mill tool.

The cutting force component tangential to tool motion and the cutting force component normal to tool motion determined by the above cutting force detection method may be combined to obtain a resultant cutting force, and feed speed and/or spindle speed may be controlled such that the resultant cutting force is not greater than a predetermined value. Alternatively, the feed speed and/or spindle speed may be controlled such that the cutting force component normal to tool motion determined by the above cutting force detection method is not greater than a predetermined value. Further, the feed speed and/or spindle speed may be controlled such that the cutting force component tangential to tool motion determined by the above cutting force detection method is not greater than a predetermined value.

In the machining by the end-mill tool, a primary component of a cutting force in a direction tangential to spindle rotation is determined based on the current value of the spindle motor, motion-axis components of the cutting force in motion-axis directions are determined based on the current values of the motion-axis motors, and the cutting force component in the direction tangential to tool motion and/or the cutting force component in the direction normal to tool motion may be determined using the determined primary component, a motion-axis component having the largest absolute value in the determined motion-axis components, the cutting-engaged angle and a motion direction angle. The cutting force component tangential to tool motion and/or the cutting force component normal to tool motion may be determined using the determined primary component, a motion-axis component in the direction of the motion axis for which a motion amount per predetermined time is the largest, the cutting-engaged angle and the motion direction angle. Further, the cutting force component in the direction tangential to tool motion may be determined based on the motion-axis components and the motion direction angle, and the cutting force component in the direction normal to tool motion may be determined based on the determined cutting force component tangential to tool motion, the primary component and the cutting-engaged angle.

The present invention also provides a control apparatus for controlling machining by an end-mill tool. The control apparatus comprises: means for detecting a current value of a spindle motor; means for determining a primary component of a cutting force in a direction tangential to spindle rotation based on the detected current value of the spindle motor and a radius of the end-mill tool; means for detecting current values of motion-axis motors for cutting feed; means for determining motion-axis components of the cutting force in motion-axis directions based on the detected current values of the motion-axis motors; means for calculating a cutting-engaged angle based on the tool radius and a depth of cut or for storing a preset cutting-engaged angle; means for calculating a motion direction angle based on motion amounts for the motion-axis motors; and means for determining a cutting force component in a direction tangential to tool motion and/or a cutting force component in a direction normal to tool motion based on the primary component, the motion-axis components, the cutting-engaged angle and the motion direction angle.

The above control apparatus may further comprise: means for combining the determined cutting force component in the direction tangential to tool motion and the determined cutting force component in a direction normal to tool motion to obtain a resultant cutting force; and means for controlling feed speed and/or spindle speed such that the resultant cutting force is not greater than a predetermined value.

Alternatively, the above control apparatus may comprising: means for controlling feed speed and/or spindle speed such that the determined cutting force component in the direction normal to tool motion is not greater than a predetermined value.

Further, the above control apparatus may comprising: means for controlling feed speed and/or spindle speed such that the determined cutting force component in the direction tangential to tool motion is not greater than a predetermined value.

The means for determining the cutting force component in the direction normal to tool motion and/or the cutting force component in the direction tangential to tool motion may determine one or both of these cutting force components using the primary component, a motion-axis component having the largest absolute value in the determined motion-axis components, the cutting-engaged angle and the motion direction angle.

Alternatively, the means for determining the cutting force component in the direction normal to tool motion and/or the cutting force component in the direction tangential to tool motion may determine one or both of these cutting force components using the primary component, a motion-axis component in the direction of the motion axis for which a motion amount per predetermined time is the largest, the cutting-engaged angle and the motion direction angle.

Further, the means for determining the cutting force component in the direction normal to tool motion and/or the cutting force component in the direction tangential to tool motion may determine the cutting force component in the direction tangential to tool motion based on the motion-axis components and the motion direction angle, and may determine the cutting force component in the direction normal to tool motion based on the cutting force component in the direction tangential to tool motion, the primary component and the cutting-engaged angle.

BRIEF DESCRIPTION OF THE DRAWINGS

FIG. 4 is a view for explaining the principle of this invention in determining cutting forces Fm and Fs of a cutting force vector F in the directions tangential and normal to tool motion;

FIG. 7 is a view showing experimental results;

DETAILED DESCRIPTION

Figure 1:
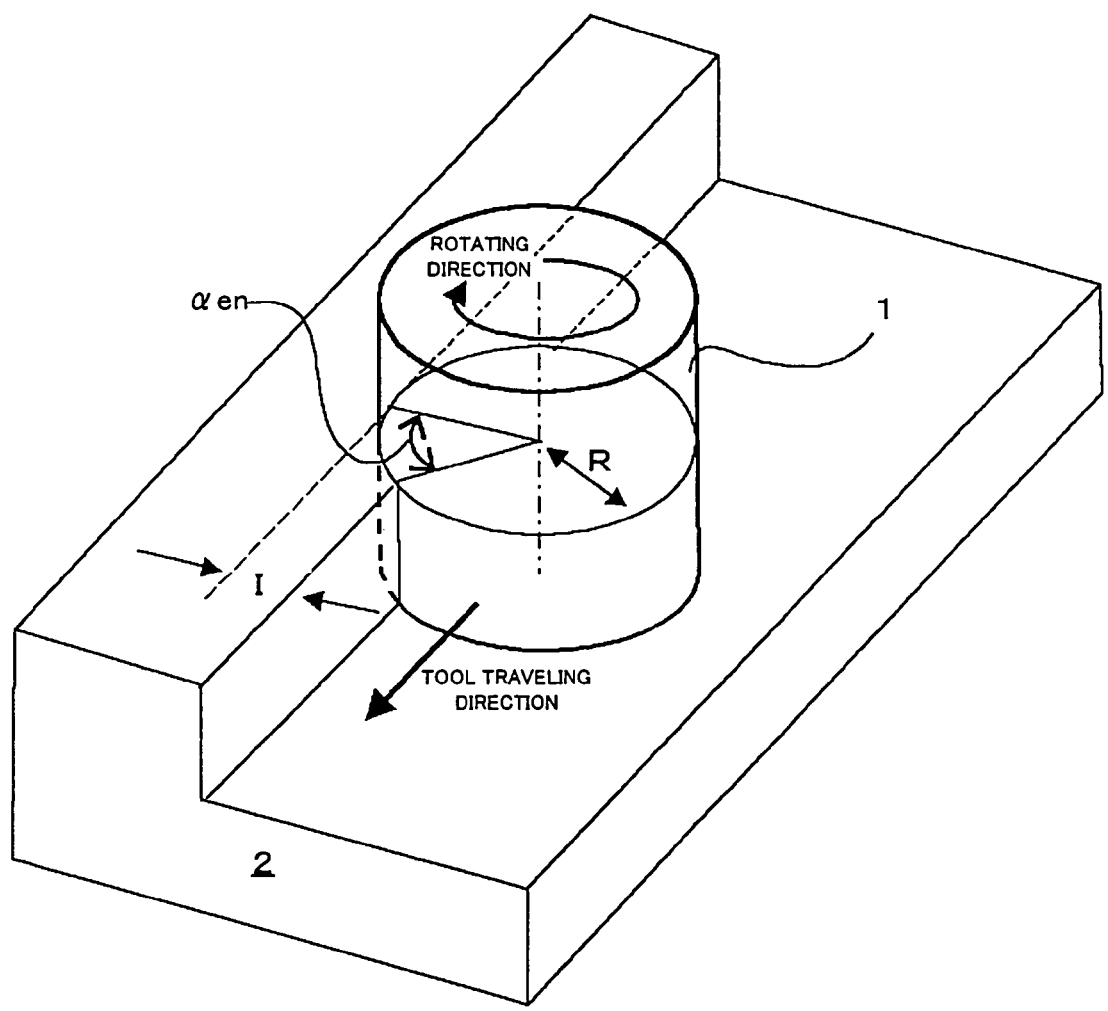
FIG. 1 is a perspective view showing a state of cutting performed by a square end mill to explain the principle of this invention.

First, the principle of this invention will be explained. FIG. 1 is a view showing a state where a workpiece 2 is being cut by a square end-mill tool 1 with a depth of cut I. A main spindle (tool) rotates forwardly (clockwise in FIG. 1), and cutting is performed with a down cut method as illustrated.

A cutting-engaged angle $\alpha en$ (positive in the direction shown by arrow in FIG. 4 and measured in units of radian), representing that portion of the square end-mill tool 1 which serves to cut the workpiece 2, can be determined by calculation based on a radius R of the tool 1 and a depth of cut I in accordance with the following equation (1):

$$\alpha en = \cos^{-1}((R-I)/R) \quad (1)$$

Figure 2:
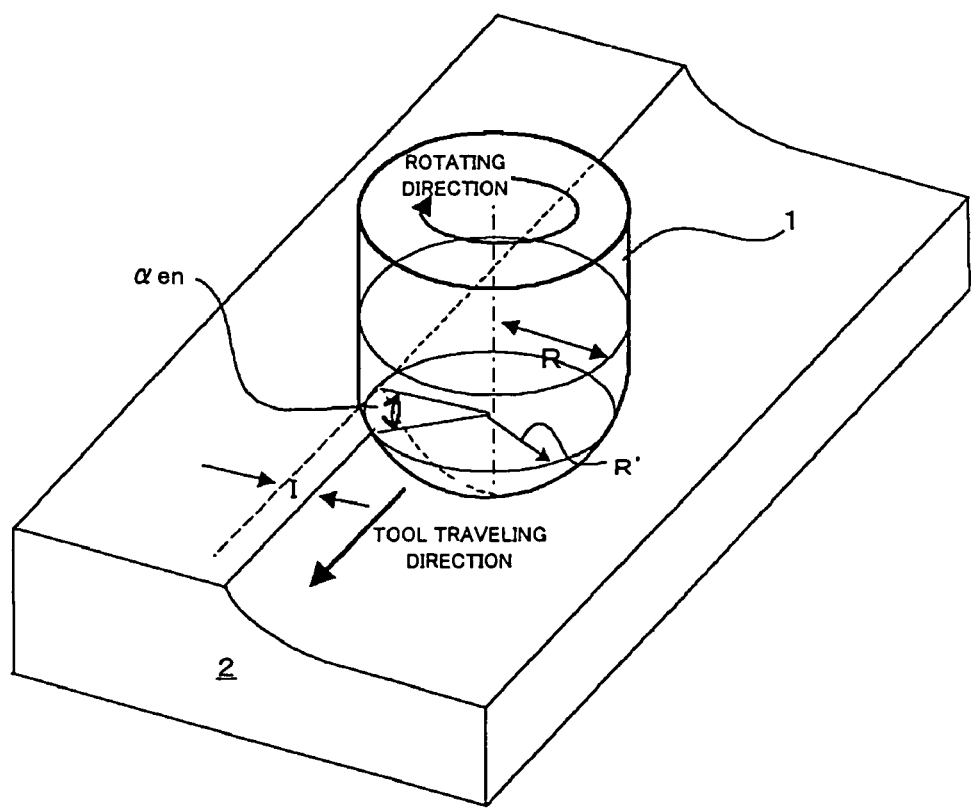
FIG. 2 is a perspective view showing a state of cutting performed by a ball end mill to explain the principle of this invention.
Figure 3:
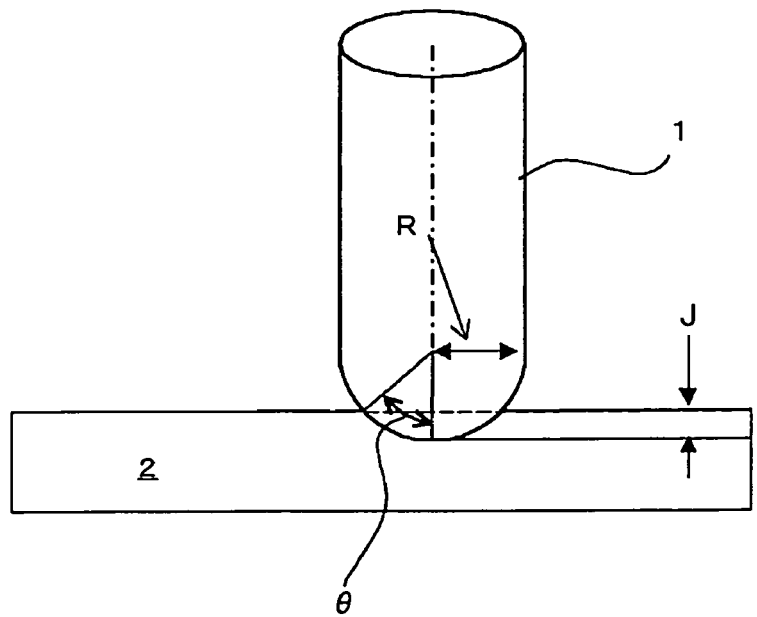
FIG. 3 is a front view corresponding to FIG. 2.

In the case of machining performed by a ball end mill, the cutting-engaged angle $\alpha en$ can be determined as shown in FIGS. 2 and 3 in accordance with the following equation (2):

$$\alpha en = \cos^{-1}((R^*\sin\theta - I)/(R^*\sin\theta)) \quad (2)$$

FIG. 2 is a perspective view showing a state where the workpiece 2 is being cut by means of the ball end-mill tool 1, and FIG. 3 is a front view. Also in this case, the tool radius and the depth of cut I are represented by R and I, respectively. Symbol J indicates a depth of cut in the tool axis direction. As shown in FIG. 3, a distal end cutting-engaged angle $\theta$, representing that a distal end portion of the ball end-mill tool 1 which serves to cut the workpiece 2, can be determined in accordance with the following equation (3):

$$\theta = \cos^{-1}((R-J)/R) \quad (3)$$

As shown in FIG. 2, the tool radius R' of the portion that performs cutting equals to $R \sin\theta$, and thus the cutting-engaged angle $\alpha en$ is determined in accordance with equation (2) in which R' ($=R \sin\theta$) is used instead of the radius R in equation (1) that is used to determine the cutting-engaged angle $\alpha en$ for the square end-mill tool 1.

FIG. 4 is a view for explaining the principle of determining cutting forces Fm and Fs of a cutting force vector F in the directions tangential and normal to the tool motion, on the basis of a current value of the spindle motor, current values of motors for driving motion axes (X- and Y-axes) serving to feed the tool 1, the cutting-engaged angle $\alpha en$, etc.

As shown in FIG. 4, an X-Y coordinate system serves as a machine tool coordinate system, and an Ft0-Fn0 coordinate system serves as a reference coordinate system for the cutting. A motion direction angle $\beta$ (measured in units of radian) of the end-mill tool (square end-mill tool or ball end-mill tool) 1 relative to the workpiece 2 can be determined by calculation based on interpolation data $\Delta X$ and $\Delta Y$ for the X- and Y-motion axes in accordance with the following equation (4):

$$\beta = \tan^{-1}(\Delta Y/\Delta X) \quad (4)$$

The motion direction angle $\beta$ can be determined from the interpolation data only if the angle $\beta$ falls within a range from 0 to $\pi$. In the case of $\Delta Y < 0$, the motion direction angle $\beta$ equals to the sum of $\beta$ and $\pi$ ($\beta = \beta + \pi$).

The cutting-engaged angle $\alpha en$ is determined based on the tool radius R, the depth of cut I, and the depth of cut J in the tool axis direction in accordance with equation (1) or (2) as mentioned above. The cutting-engaged angle $\alpha en$ determined in the process of CAM may be specified in a machining program. Alternatively, it may be calculated based on the radius R and depths of cut I, J of a tool specified in a machining program. From the thus determined cutting-engaged angle $\alpha en$, a cutting-point angle $\gamma$ can be determined according to the following equation (5):

$$\gamma = \beta - \{(\pi/2) - \alpha en\} \quad (5)$$

A primary component (tangential cutting force in the direction of spindle rotation) of the cutting force vector F can be determined based on spindle current value As and coefficient Kt(R), which varies as a function of the tool radius R, in accordance with the following equation (6):

$$Ft = Kt(R) * As \quad (6)$$

X-axis and Y-axis components (X-axis and Y-axis cutting forces) Fx and Fy of the cutting force vector F can respectively be determined based on current values Avx, Avy of motion axis motors for the X- and Y-motion axes and coefficients Kx(Px), Ky(Py), each of which varies as a function of a corresponding one of pitches Px, Py of respective axis ball screws, in accordance with the following equations (7) and (8):

$$Fx = Kt(Px) * Avx \quad (7)$$

$$Fy = Ky(Py) * Avy \quad (8)$$

To determine the primary component (tangential cutting force in the direction of spindle rotation) Ft and a thrust component (normal cutting force with respect to the direction of spindle rotation) Fn is equivalent to reversely rotate the cutting force vector F by $(\gamma + \pi/2)$ radians to make a conversion into the reference coordinate system (Ft0, Fn0) of tangential and normal coordinate axes Ft0, Fn0 extending in the directions opposite to the tool rotation and toward the tool center, respectively. Thus, equation (9) for reversely rotating Fx and Fy by $(\gamma + \pi/2)$ radians is fulfilled, which is as follows:

$$\begin{bmatrix} Ft \\ Fn \end{bmatrix} = \begin{bmatrix} \cos(-\gamma - \pi/2) & -\sin(-\gamma - \pi/2) \\ \sin(-\gamma - \pi/2) & \cos(-\gamma - \pi/2) \end{bmatrix} \begin{bmatrix} Fx \\ Fy \end{bmatrix} \quad (9)$$

By rotating Ft and Fn by the cutting-engaged angle $\alpha en$, the cutting forces Fm and Fs of the cutting force vector F that are tangential and normal to the direction of tool motion can be determined as shown in the following equation (10):

$$\begin{bmatrix} Fm \\ Fs \end{bmatrix} = \begin{bmatrix} \cos(\alpha en) & -\sin(\alpha en) \\ \sin(\alpha en) & \cos(\alpha en) \end{bmatrix} \begin{bmatrix} Ft \\ Fn \end{bmatrix} \quad (10)$$

From equations (9) and (10), the following relation or equation (11) is fulfilled:

$$\begin{bmatrix} Fm \\ Fs \end{bmatrix} = \begin{bmatrix} \cos(-\beta) & -\sin(-\beta) \\ \sin(-\beta) & \cos(-\beta) \end{bmatrix} \begin{bmatrix} Fx \\ Fy \end{bmatrix} \quad (11)$$

This invention determines the cutting forces Fm and Fs of the cutting force vector F that are tangential and normal to the direction of tool motion. In this regard, the motion direction angle $\beta$ is determined from interpolation data, and the cutting-engaged angle $\alpha en$ and the cutting-point angle $\gamma$ are determined from data described in a machining program. Thus, the cutting forces Fm, Fs of the cutting force vector F tangential and normal to the direction of tool motion can be determined by performing the calculation of equation (11) after detecting driving currents for the X and Y motion axes and determining the X-axis and Y-axis components Fx, Fy of the cutting force vector F in accordance with equations (7) and (8).

However, load on the X- and Y-axes is affected by frictional resistance generated in a guide and ball screw system as mentioned above, and accordingly the detection accuracy is lowered. On the other hand, the primary component (tangential cutting force in the spindle rotation direction) Ft is determined based on the driving current value As for the spindle motor as shown by equation (6). The spindle motor generates a rotational output torque to rotate the main spindle and the end-mill tool 1 attached thereto, and there is not so much frictional resistance in a torque transmission path from the spindle motor to the end-mill tool. Thus, the drive current value (output torque) of the spindle motor more accurately represents the current value required to overcome the cutting force Ft than that of a motion axis motor. In other words, the primary component (tangential cutting force in the spindle rotation direction) Ft determined from the driving current value of the spindle motor accurately represents the tangential cutting force.

Therefore, the primary component Ft which is high in accuracy is used to determine the cutting forces Fm and Fs of the cutting force vector F that are tangential and normal to the direction of tool motion.

If the primary component Ft and either the X-axis or Y-axis component Fx or Fy are known, both the primary and thrust components Ft, Fn can be determined according to equation (9). Substitution of these components Ft, Fn in equation (10) yields the cutting forces Fm, Fs of the cutting force vector F that are tangential and normal to the direction of tool motion. To enhance the accuracy of determination, the X-axis or Y-axis component Fx or Fy of the cutting force vector F, determined by equations (7) and (8) is used, whichever is the larger in absolute value. Alternatively, the axial component Fx or Fy is used that corresponds to the X- or Y-axis, whichever is the larger in motion amount. Still alternatively, by using either the X-axis or Y-axis component Fx or Fy of the cutting force vector F determined by equations (7) and (8), the cutting force Fm of the cutting force vector F tangential to tool motion is determined by equation (11) (the tangential cutting force Fm determined by equation (11) is adopted in order to reduce an error since it is generally larger than the normal cutting force Fs), and the cutting force Fs normal to tool motion is then determined by equation (10) using the thus determined tangential cutting force Fm and the primary component Ft determined according to equation (6).

In summary, calculation is carried out according to either one of the following methods (a)–(c):

(a) The cutting forces Fm, Fs tangential and normal to tool motion are determined according to equations (9), (10) using the primary component Ft determined by equation (6) and either the X-axis or Y-axis component Fx or Fy, determined by equations (7) and (8), whichever is the larger in absolute value.

(b) The cutting forces Fm, Fs tangential and normal to tool motion are determined by equations (9), (10) using the primary component Ft determined by equation (6) and either the X-axis or Y-axis component Fx or Fy determined by equations (7) and (8) and relating to the X-axis or Y-axis, whichever is the larger in motion amount $\Delta X$ or $\Delta Y$.

(c) The cutting force Fm of the cutting force vector F tangential to tool motion is determined by equation (11) using the X-axis and Y-axis components Fx, Fy of the cutting force determined by equations (7), (8), and then the cutting force Fs normal to tool motion is determined by equation (10) using the tangential cutting force Fm and the primary component Ft that is determined by equation (6).

Using the thus determined cutting forces Fm, Fs that are tangential and normal to tool motion, various cutting controls can be achieved as mentioned below.

(i) Control to make the magnitude of the cutting force vector F equal to or less than a predetermined value.

Specifically, the feed speed and/or the spindle speed is controlled such that a combined cutting force Fc is equal to or less than a predetermined value Fc0 after the combined cutting force Fc is determined based on the cutting forces Fm, Fs tangential and normal to tool motion in accordance with the following equation (12):

$$Fc=(Fm^2+Fs^2)^{1/2} \quad (12)$$

In a case where a ball end mill is employed, a Z-axis component (Z-axis cutting force) Fz of the cutting force is determined by equation (13) given below, using a current value Avz of a motion axis motor for the Z motion axis and a coefficient Kz(Pz) varying as a function of a pitch Pz of the Z-axis ball screw, a combined cutting force Fc is then determined in accordance with equation (14) given below, and the feed speed and/or the spindle speed is controlled such that the combined cutting force Fc is equal to or less than a predetermined value Fc0.

$$Fz=Kz(Pz)*Avz \quad (13)$$

$$Fc=(Fm^2+Fs^2+Fz^2)^{1/2} \quad (14)$$

By controlling the combined cutting force Fc acting on the tool so as to be always equal to or less than the predetermined appropriate value Fc0, the following advantages can be attained:

The tool life can be extended; and

Heat generation can be suppressed to reduce a machining error which would be caused by thermal deviation.

(ii) Control of cutting force Fs normal to tool motion.

The feed speed and/or the spindle speed is controlled such that the cutting force Fs normal to the tool motion, i.e., the cutting force acting perpendicular to the tool traveling direction, is always kept equal to or less than a predetermined value Fs0.

The cutting force Fs normal to the tool motion, which is a force acting perpendicular to the tool traveling direction, can cause the end-mill tool 1 to incline from its vertical position on the machined surface. When the machining is carried out with the inclined end-mill tool 1, the machining accuracy is lowered accordingly. By controlling the cutting force Fs normal to the tool motion so as to be equal to or less than the predetermined value, the inclination is made equal to or less than an allowable limit, whereby the machining shape accuracy can be prevented from lowering.

(iii) Control of cutting force Fm tangential to tool motion.

The feed speed and/or the spindle speed is controlled such that the cutting force Fm tangential to the tool motion, which is a cutting force acting in the tool traveling direction, is equal to or less than a predetermined value Fm0.

As a result, machining irregularities caused by a large or small change in the cutting force in the tool traveling direction can be improved, making it possible to prevent the machining surface quality from being lowered due to machining irregularities.

In the examples shown in FIGS. 1, 2 and 4, the spindle (tool 1) rotates in the forward direction, the cutting is made by a down-cut method, and the tool 1 is arranged to be movable. However, the above is also applicable to a case where the spindle rotates in the reverse direction and/or the cutting is made by an up-cut method and/or the table is arranged to be movable. In the above, movements in the X-motion and Y-motion axes alone have been described, but movements may be made in arbitrary axes.

The present inventors made tests using the square end-mill tool to examine to what accuracy the cutting force can be determined from the current value of the spindle motor.

Figure 5:
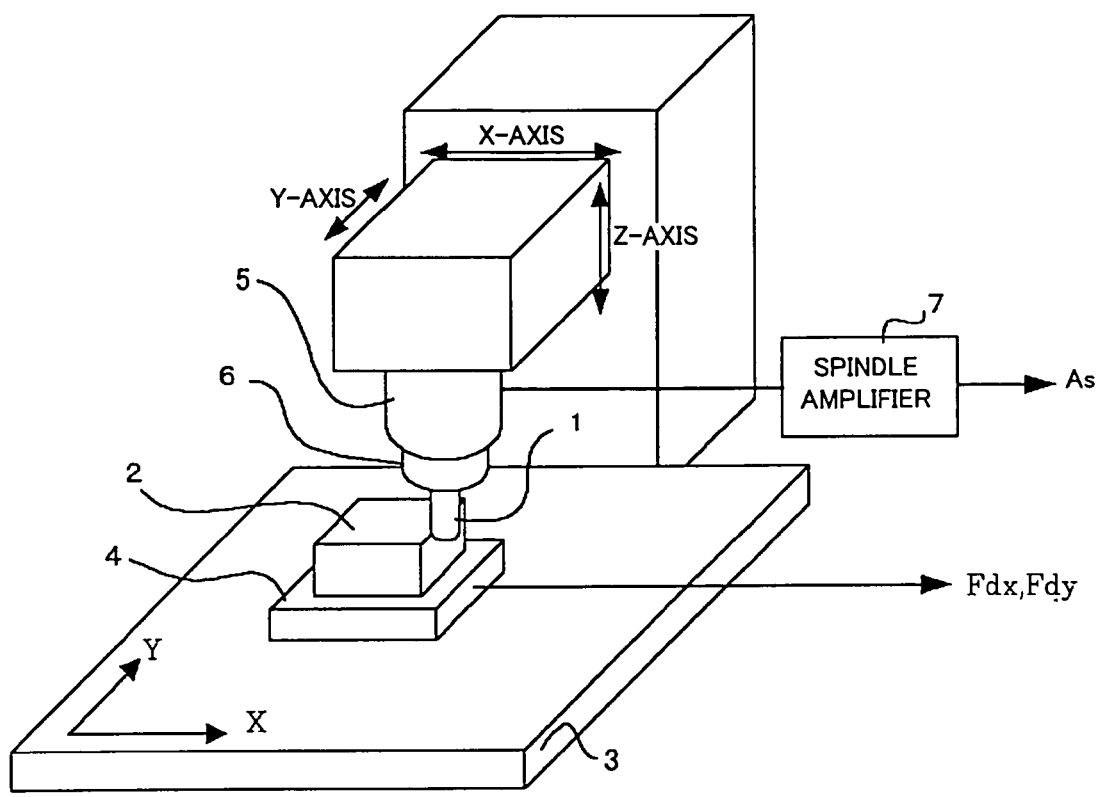
FIG. 5 is a view showing the outline of a testing apparatus for evaluating the accuracy of this invention in determining cutting forces.

FIG. 5 is a view showing the outline of the testing apparatus.

A respective workpiece 2 placed on a dynamometer 4 was cut using a square end-mill tool 1. The dynamometer 4 included highly sensitive piezoelectric elements used for measurement of X- and Y-axis cutting forces. In the example shown in FIG. 5, the main spindle 6 attached with the tool 1 was moved in the perpendicular X-, Y- and Z-axis directions, and the tool 1 was drivingly rotated by means of a spindle motor 5. A spindle motor current value As was detected using a spindle amplifier 7.

By using cutting forces Fdx, Fdy detected by the dynamometer 4 as variables Fx and Fy in equation (9) and by using a cutting-point angle γ determined from a cutting-engaged angle αen and a motion direction angle β, a tangential cutting force Fdt was determined according to the following equation (15):

$$Fdt=\cos(-\gamma-\pi/2)*Fdx-\sin(-\gamma-\pi/2)*Fdy \quad (15)$$

Then, the thus determined tangential cutting force Fdt was multiplied by the radius R of the tool 1 (Fdt*R), to thereby obtain a "torque value measured by the dynamometer (cutting force value)." On the other hand, a value Ft was determined, as a "tangential cutting force value derived from spindle motor current" from a spindle motor current As in accordance with equation (6). Then, the value Ft was compared with the torque value Fdt*R to examine to what extent the value Ft derived from the spindle motor current As in accordance with equation (6) was reliable. Results of first and second end-mill machining are shown in FIG. 7.

Figure 6A:
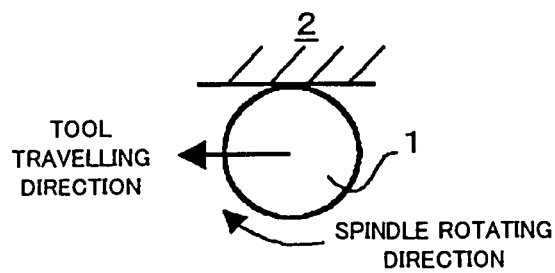
FIGS. 6a and 6b are views for explaining examples of machining performed by experimental equipment.

As shown in FIG. 6a, the first machining was performed by a down-cut method in which the tool 1 having a radius R of 0.005 m was moved relative to the workpiece 2 in a negative X-axis direction (180-degree direction), while rotating the spindle by extension the tool 1 in the forward direction, with the workpiece 2 placed on the right in the tool traveling direction.

Figure 6B:
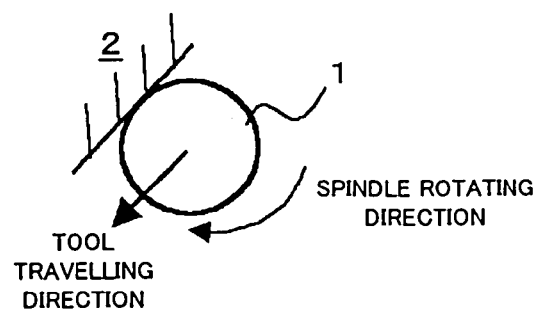

On the other hand, in the second machining, down-cut machining was performed as shown in FIG. 6b in which the same tool as in the first machining was moved in negative X- and Y-axis directions (225-degree direction) relative to the workpiece 2 placed on the right in the tool traveling direction, while forwardly rotating the spindle and the tool. In each of the first and second machining, measurement was made while varying the feed speed and the depth of cut.

As seen from the comparison table of FIG. 7, "tangential cutting force values Ft derived from spindle motor current" determined by equation (6) are in good coincide with "torque values Fdt*R measured by the dynamometer (cutting force values)." This indicates that the value Ft determined by equation (6) can satisfactorily be used as calculation values in this invention. Further, the cutting forces Fm and Fs tangential and normal to the tool motion can be obtained with accuracy in accordance with equations (9)–(11) by means of calculations explained in the methods (a)–(c).

Figure 8:
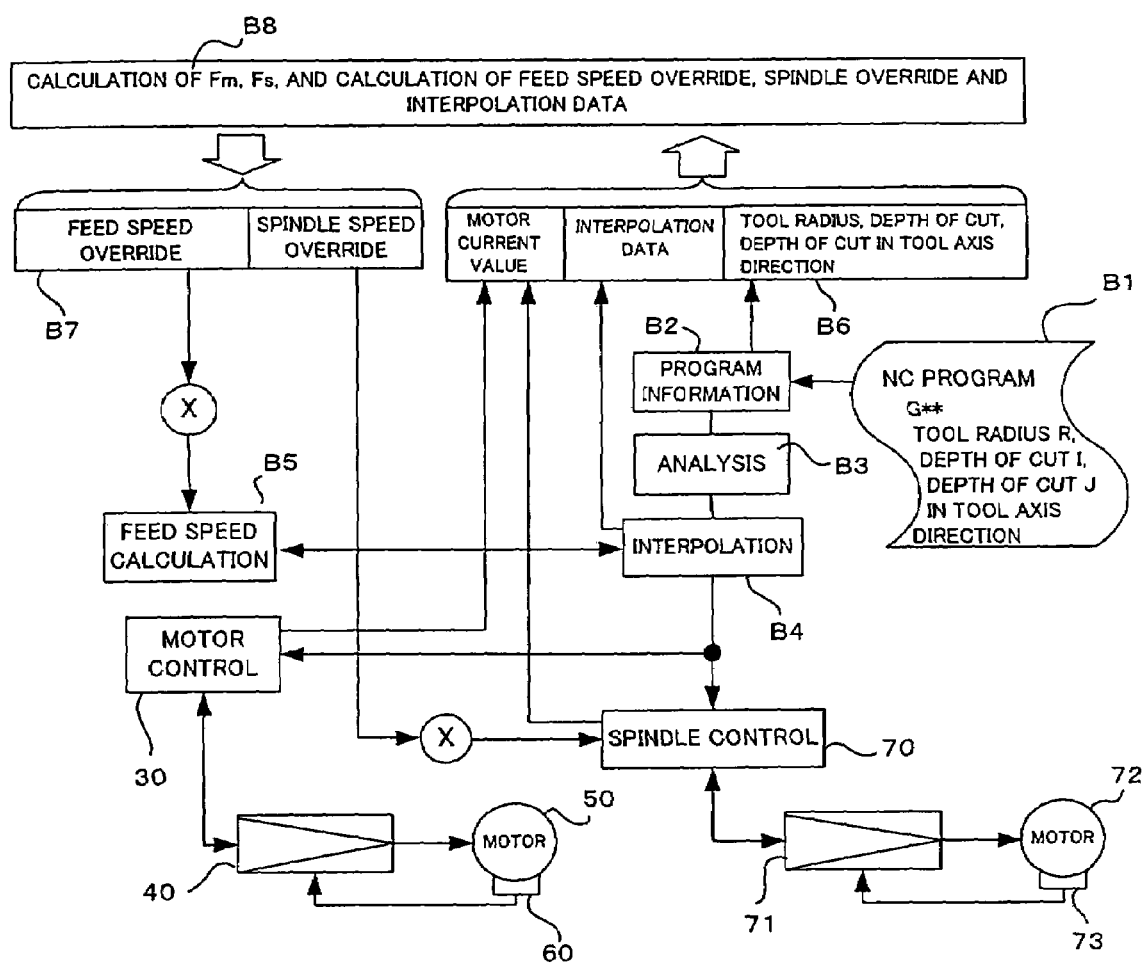
FIG. 8 is a functional block diagram of an embodiment of this invention.

FIG. 8 is a functional block diagram of a controller according to one embodiment of this invention. Pieces of program information in an NC program B1 are read (B2). If the thus read information includes a motion command, then the information is analyzed (B3), interpolation processing is performed (B4), and pieces of processed information are output to motor-control sections 30 for the respective motion axes. Each motor-control section 30 performs the position and velocity loop control based on a given motion command and position and velocity feedback signals supplied from a position and velocity detector 60, and then performs the current loop control based on a feedback signal supplied from a current detector, not shown, to thereby drivingly control a motion axis motor 50 through a motor amplifier 40. If the programmed information includes a spindle rotation command, then a rotational velocity command is output to a spindle control section 70 which performs the velocity loop control based on the commanded rotational velocity and a velocity feedback signal supplied from a position coder 73, thereby drivingly controlling a spindle motor 72 through a spindle amplifier 71.

If pieces of programmed information are read that specify a tool diameter (which is determined according to tool specified by program) R, a depth of cut I, and a depth of cut J in the tool axis direction, these pieces of information are stored. Then, amounts of motion command $\Delta X$, $\Delta Y$ obtained by the interpolation processing (B4) as well as driving currents Avx, Avy for the X- and Y-motion axis motors and a driving current As for the spindle motor that are determined by the motor-control sections are read (B6). Next, cutting forces Fm and Fs tangential and normal to the tool motion are determined by equations (1)–(11) using the pieces of information R, I, J, $\Delta X$, $\Delta Y$, Avx and Avy. Based on the determined cutting forces Fm, Fs and according to requirements in the intended control (i), (ii) or (iii), feed speed override values for the respective motion axes and an override value for the spindle rotation speed are calculated (B8 and B7). Subsequently, the feed speed commanded by the program B1 is multiplied by the determined feed speed override value to calculate the feed speed (B5) which is used for the interpolation processing in the interpolation processing section (B4). In the spindle control section 70, the spindle speed commanded by program is multiplied by the determined spindle override value to thereby determine a new spindle speed to which the spindle speed is controlled.

In this manner, the intended control (i), (ii) or (iii) is realized.

Figure 9:
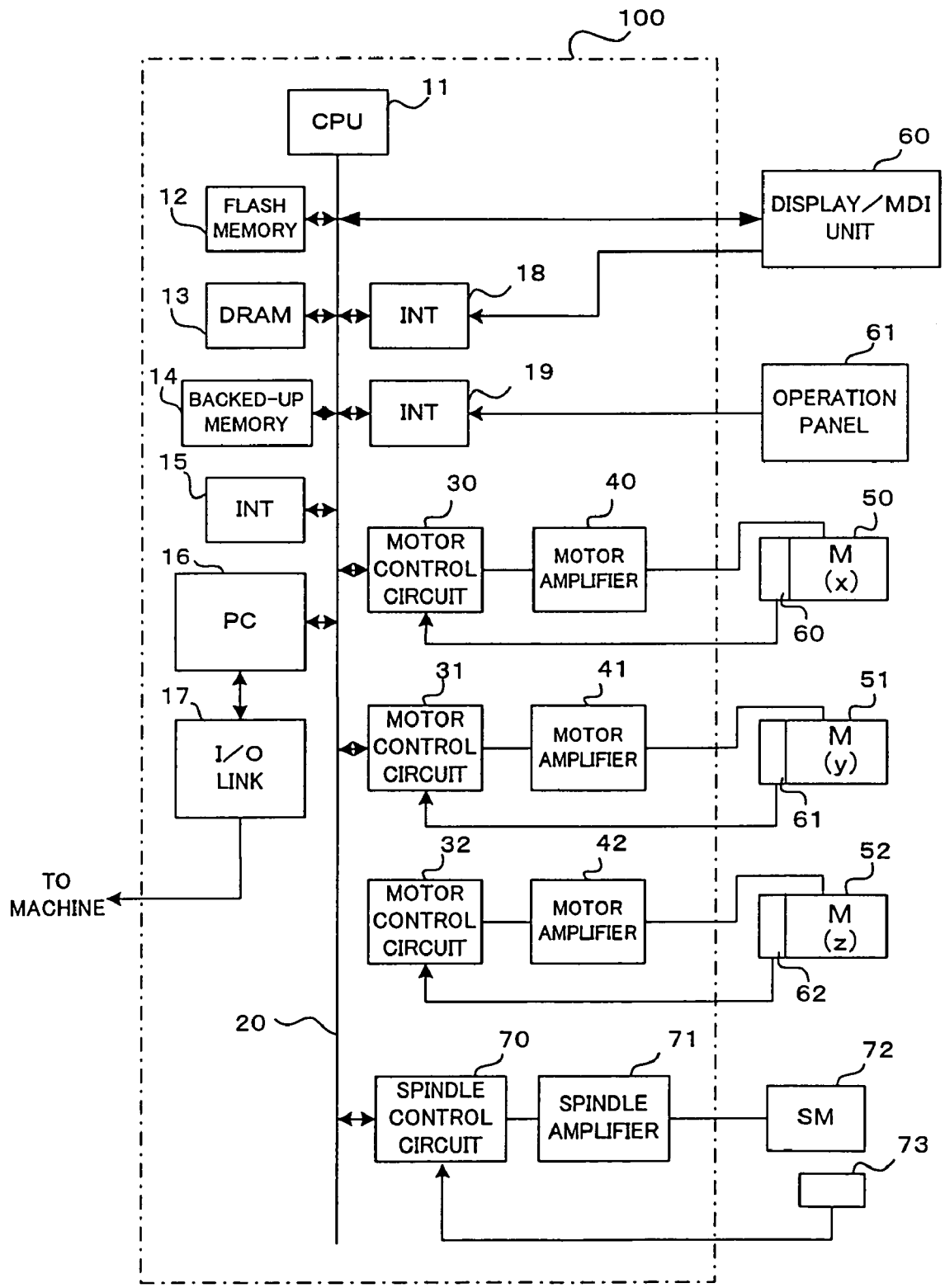
FIG. 9 is a block diagram showing essential part of hardware of a control apparatus according to the embodiment of this invention.

FIG. 9 is a block diagram showing the hardware of a control apparatus 10 according to one embodiment for embodying this invention.

A CPU 11 is a processor used for the overall control of the control apparatus 10. Specifically, the CPU 11 reads, via a bus 20, a system program stored in a flash memory 12, and stores the same in a DRAM 13. In accordance with the system program stored in the DRAM 13, the CPU controls the entirety of the control apparatus. The DRAM 13 is also stored with temporal data for calculation and display data as well as various data input by an operator through a display/MDI unit 80. A backed-up memory 14 is backed up by a battery, not shown, and is hence constituted as a non-volatile memory capable of holding stored contents, even if the power to the control apparatus 10 is shut off. The memory 14 stores machining programs read through an interface 15 or input through the display/MDI unit 80, and the like. Various system programs for embodying the aforementioned cutting force-based machining control methods are written beforehand in the flash memory 12.

The interface 15 is used to connect external equipment with the control apparatus 10. A machining program, etc. are read from the external equipment. A programmable machine controller (PMC) 16 operates in accordance with a sequence program stored in the control apparatus 10, and outputs signals to auxiliary equipment of a machine tool through an I/O link 17, thereby controlling the equipment.

The display/MI unit 80 is a manual data input device that is provided with a liquid or CRT display, a keyboard, etc. An interface 18 receives commands and data from the keyboard of the display/MDI unit 80 and outputs the same to the CPU 11. An operation panel 81 connected to the interface 19 is provided with a manual pulse generator, various switches, etc.

Motor control circuits 30–32 for the X-, Y- and Z-motion axes receive motion commands for the respective axes from the CPU 11, effect position, velocity and current loop control, and output drive commands for the respective motion axes to motor amplifiers 40–42. In response to the commands, the motor amplifiers 40–42 drive motion axis motors 50–52. These motion axis motors 50–52 feed position/velocity feedback signals back to the motor control circuits 30–32 through the motor amplifiers 40–42, the feedback signals being supplied from position/velocity detectors 60–62 installed in the motion axis motors 50–52. Each of the motor control circuits 30–32 carries out position/velocity loop control in accordance with the motion command and the feedback signal. Although illustrations are omitted, the motor amplifiers 40–42 carry out the feedback of drive current to the motor control circuits 30–32 which also perform current loop control in accordance with the current feedback signals. The drive current feedback signals fed back to the motor control circuits 30–32 are read out and used for the cutting force calculation according to this invention.

The spindle control circuit 70 receiving a spindle rotation command outputs a spindle speed signal to the spindle amplifier 71, which responds to the spindle speed signal to cause the spindle motor to rotate at the commanded rotational speed. The position coder 73 supplies feedback pulses to the spindle control circuit 70 in synchronism with the rotation of the spindle motor 72, whereby velocity control is performed by the spindle control circuit 70 which also carries out current loop control while receiving the feedback of spindle motor drive current from the spindle amplifier. In relation to this invention, the feedback signal indicative of the drive current of the spindle motor 72 is read out for the cutting force-based machining control.

The above described hardware arrangement of the control apparatus 10 is the same as the conventional numerical controller except that programs for the cutting force-based machining control are stored in the flash memory 12.

Figure 10:
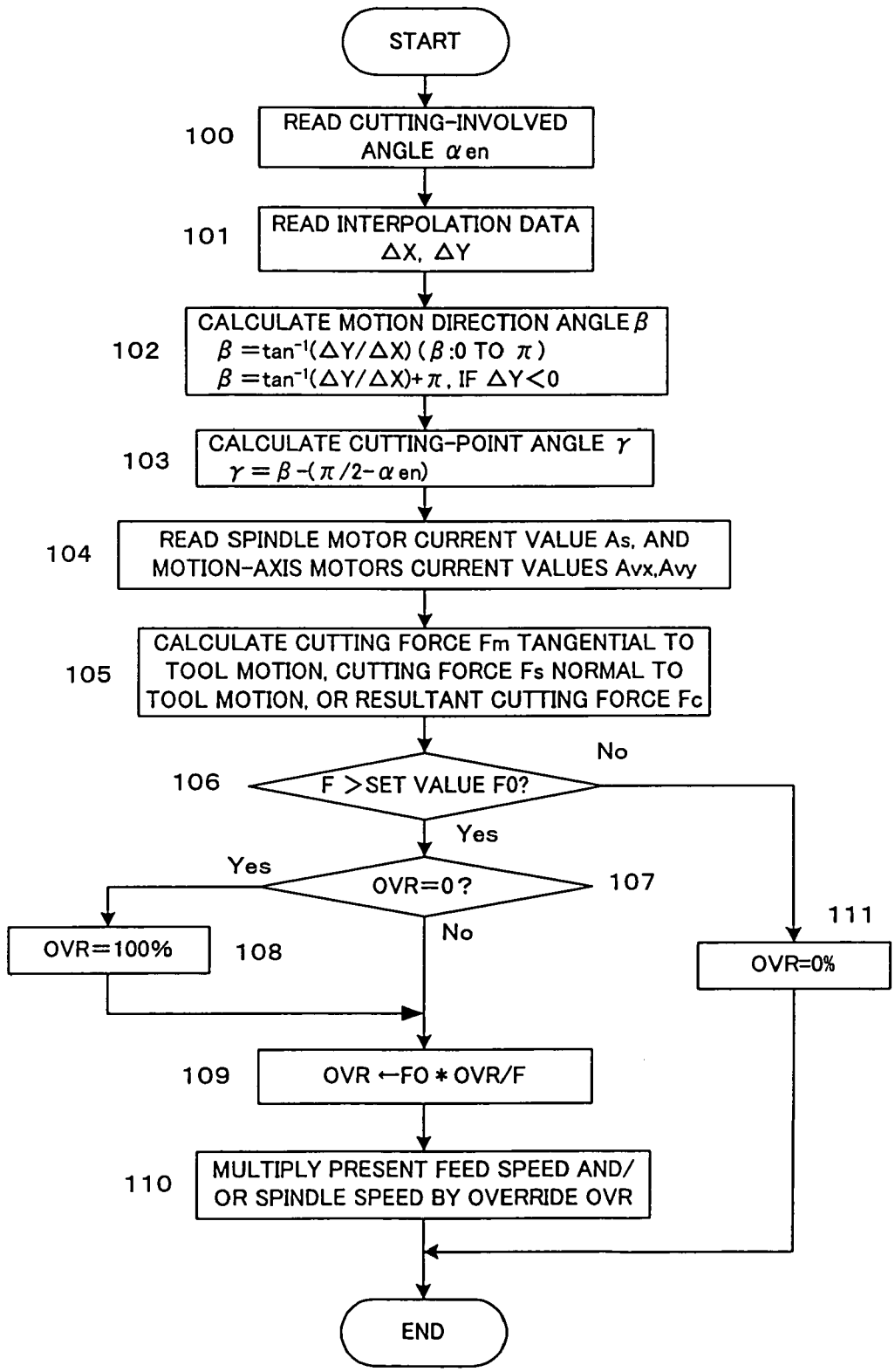
FIG. 10 is a flowchart of processing in a cutting force-based machining control method according to the embodiment.

FIG. 10 is a flowchart of processing which is executed for the cutting force-based machining control at intervals of a predetermined period (distribution period) by the control apparatus of this embodiment.

The coefficients Kx(Px) and Ky(Py) in equations (7) and (8) individually varying as a function of ball screw pitches P in the X- and Y-motion axes are determined beforehand in the form of parameter setting. The coefficient Kt(R) in equation (6) varying as a function of the radius R of the tool 1 is preset and stored beforehand for every available type of tool 1. A cutting force value F0 used for adjustment of override OVR is also preset so as to satisfy requirements for the controls (i)–(iii). Specifically, in the case of control (i) where the combined cutting force Fc is controlled so as to be equal to or less than the predetermined value Fc0, the predetermined target value Fc0 is set as the preset value Fc0. In the case of control (ii) for controlling the cutting force Fs normal to tool motion to be equal to or less than the predetermined value Fs0, this value Fs0 is preset. In the case of control (iii) for controlling the cutting force Fm tangential to tool motion to be equal to or less than the predetermined value Fm0, this value Fm0 is preset.

When the machining program read by the CPU 11 includes a tool radius R, a depth of cut I, and a depth of cut J in the tool axis direction, a cutting-engaged angle αen is calculated in the preprocessing prior to motion command-based distribution processing, in accordance with equation (1) or (2) using the read tool radius R, the depth of cut I, and the depth of cut J in the tool axis direction, and the calculated cutting-engaged angle is stored.

The processing of FIG. 10 is executed at intervals of the predetermined period (distribution period).

First, the cutting-engaged angle αen determined and stored in the preprocessing is read, and interpolation data ΔX, ΔY determined by interpolation processing is also read out (Steps 100 and 101). Then, using the interpolation data ΔX and ΔY, the calculation ($\beta = \tan^{-1}(\Delta Y/\Delta X)$) of equation (4) is carried out to determine a motion direction angle β. If the data Δy is negative, then π is added to β to obtain the angle $\beta \leftarrow \beta + \pi$ (Step 102)

Next, by using the motion direction angle β and the cutting-engaged angle αen, the calculation ($\gamma = \beta - \{(\pi/2) - \beta en\}$) of equation (5) is carried out to determine a cutting-point angle γ (Step 103). Then, a drive current value Ax for the spindle motor and drive current values Avx, Avy for the X- and Y-motion axis motors are read from the spindle control circuit 70 and the motor control circuits 30 and 31, respectively (Step 104).

Subsequently, on the basis of the determined cutting-engaged angle αen, the motion direction angle β, the cutting-point angle γ, the spindle motor drive current value As, and the X-, Y-motion axis motor drive current values Avx and Avy, a cutting force Fm tangential to tool motion or a cutting force Fs normal to tool motion or a combined cutting force Fc is determined (Step 105).

More specifically, the calculation of equation (6) is carried out using the spindle motor drive current value As and the coefficient Kt(R) corresponding to the preset tool radius R. whereby the primary component (cutting force tangential to the spindle rotation direction) Ft of the cutting force is determined. Further, the calculations of equations (7) and (8) are carried out using the motor drive current values Avx, Avy and the preset coefficients Kx(Px), Ky(Py) to thereby determine motion axis components Fx, Fy of the cutting force.

Next, using the determined primary component Ft, the motion axis components Fx, Fy, the cutting-engaged angle αen, the motion direction angle β, and the cutting-point angle γ, cutting forces Fm and Fs tangential and normal to the tool motion are determined according to equations (9)–(11) by means of either one of the methods (a)–(c). Meanwhile, in case that the method (i) is used to effect machining control based on the combined cutting force Fc, both the cutting forces Fm and Fs tangential and normal to tool motion must be determined, which are used to carry out the calculation of equation (12) to determine the combined cutting force Fc. On the other hand, in the case of using the method (ii) to effect machining control based on the cutting force Fs normal to tool motion, only the normal cutting force Fs may be determined. In the case of using the method (iii) to effect machining control based on the cutting force Fm tangential to tool motion, only the tangential cutting force Fm may be determined.

Next, the thus determined combined cutting force Fc, or the cutting force Fs normal to tool motion, or the cutting force Fm tangential to tool motion is compared with a preset value F0 (Step 106). Specifically, in the case of the combined cutting force-based control method (i), the combined cutting force Fc is compared with the preset value Fc0. In the normal cutting force-based control method (ii), the cutting force Fs normal to the tool motion is compared with the preset value Fs0. In the tangential cutting force-based control method (iii), the cutting force Fm tangential to the tool motion is compared with the preset value Fm0. When the preset value F0 (=Fc0, Fs0, or Fm0) is greater (it is usually greater upon start of machining), the override value OVR is made equal to 0% (Step 111). At this time, the override processing is not performed, and hence the X- and Y-motion axes and the spindle axis are controlled using the feed speed and the spindle rotation speed that are specified by program as the feed speed of the motion axes and the rotation speed of the spindle axis, respectively.

On the other hand, if the combined cutting force Fc, the normal cutting force Fs, or the tangential cutting force Fm exceeds a corresponding one of the preset values Fc0, Fs0 and Fm0, whether the override value OVR is equal to zero is determined (Step 107). In other words, whether the preset value is exceeded for the first time after start of machining is determined.

If it is determined that the override value equals to zero, the override value OVR is set to 100% (Step 108), and the flow advances to Step 109. On the other hand, if it is determined at Step 107 that the override value OVR does not equal to zero, the flow advances to Step 109 in which a new override value OVR is determined by multiplying the present override value OVR by a ratio F0/F (=Fc0/F, Fs0/Fs, or Fm0/Fm) of the preset value F0 (=Fc0, Fs0, or Fm0) to the determined force F (=Fc, Fs, or Fm).

Next, the feed speed currently specified by program is multiplied by the newly determined override value OVR, thereby determining the feed speed that is controlled so as to maintain the cutting force to be equal to or less than the predetermined value (Step 110). On the basis of the determined feed speed, the interpolation processing for the X- and Y-motion axes is carried out to obtain motion commands that are output to the motor control circuits 30, 31 to control the motion axis motors 50, 51. Alternatively, the programmed spindle rotation speed is multiplied by the override value OVR to determine a new spindle rotation speed which is commanded to the spindle control circuit 70 to control the spindle motor 72. Still alternatively, the programmed feed speed and the programmed spindle rotation speed are multiplied by the override value OVR to determine a new feed speed and a new spindle rotation speed that are used to control the X- and Y-motion axis motors 50, 51 and the spindle motor 72, respectively.

In end-mill machining, this invention is capable of detecting the cutting forces tangential and normal to tool motion, and machining controls adapted for various purposes can be realized using the determined tangential and normal cutting forces. These cutting forces can be combined to determine a combined cutting force which may be controlled so as to be equal to or less than the predetermined value, whereby tool life can be extended. Also, heat generation can be suppressed to reduce machining errors attributable to thermal affection. By controlling the cutting force normal to tool motion so as to be equal to or less than the predetermined value, the tool inclination (inclination of tool axis) can be reduced to reduce machining errors due to the tool inclination, whereby the machining shape accuracy can be improved.

Furthermore, by controlling the cutting force tangential to tool motion, machining irregularities can be reduced to prevent deterioration of the quality of machined surfaces.

What is claimed is:

1. A cutting force detection method for machining by an end mill tool, comprising the steps of:
   detecting a current value of a spindle motor and current values of motion-axis motors for cutting feed;
   determining a cutting force component in a direction tangential to tool motion and/or a cutting force component in a direction normal to tool motion using the detected current values of the spindle motor and the motion-axis motors, and a radius and a cutting-engaged angle of the end mill tool; and
   controlling the machining based on the determined cutting force component.

2. A cutting force detection method according to claim 1, wherein said step of determining the cutting force component in the direction tangential to tool motion and/or the cutting force component in the direction normal to tool motion comprises:
   determining a primary component of a cutting force in a direction tangential to spindle rotation based on the current value of the spindle motor;
   determining motion-axis components of the cutting force in motion-axis directions based on the current values of the motion-axis motors; and
   determining the cutting force component in the direction tangential to tool motion and/or the cutting force component in the direction normal to tool motion using the determined primary component, a motion-axis component having the largest absolute value in the determined motion-axis components, the cutting-engaged angle and a motion direction angle.

3. A cutting force detecting method according to claim 1, wherein said step of determining the cutting force component in the direction tangential to tool motion and/or the cutting force component in the direction normal to tool motion comprises:
   determining a primary component of a cutting force in a direction tangential to spindle rotation based on the current value of the spindle motor;
   determining a motion-axis component of the cutting force in a motion-axis direction based on a current value of a motion-axis motor of a motion axis for which a motion amount per predetermined time is the largest; and
   obtaining the cutting force component tangential to tool motion and/or the cutting force component normal to tool motion using the determined primary component, the determined motion-axis component, the cutting-engaged angle and a motion direction angle.

4. A cutting force detection method according to claim 1, wherein said step of determining the cutting force component in the direction tangential to tool motion and/or the cutting force component in the direction normal to tool motion comprises:
   determining a primary component of a cutting force in a direction tangential to spindle rotation based on the current value of the spindle motor;
   determining motion-axis components of the cutting force based on the current values of the motion-axis motors;
   determining the cutting force component in the direction tangential to tool motion based on the determined motion-axis components and a motion direction angle; and
   determining the cutting force component in the direction normal to tool motion based on the determined cutting force component tangential to tool motion, the determined primary component and the cutting-engaged angle.

5. A control method for controlling machining by an end mill tool, comprising the steps of:
   detecting a current value of a spindle motor and current values of motion-axis motors for cutting feed;
   determining a cutting force component in a direction tangential to tool motion and a cutting force component in a direction normal to tool motion using the detected current values of the spindle motor and the motion-axis motors, and a radius and a cutting-engaged angle of the end mill tool;
   combining the determined cutting force component tangential to tool motion and the determined cutting force component normal to tool motion to obtain a resultant cutting force; and
   controlling feed speed and/or spindle speed such that the resultant cutting force is not greater than a predetermined value.

6. A control method according to claim 5, wherein said step of determining the cutting force component in the direction tangential to tool motion and/or the cutting force component in the direction normal to tool motion comprises:
   determining a primary component of a cutting force in a direction tangential to spindle rotation based on the current value of the spindle motor;
   determining motion-axis components of the cutting force in motion-axis directions based on the current values of the motion-axis motors; and
   determining the cutting force component in the direction tangential to tool motion and/or the cutting force component in the direction normal to tool motion using the determined primary component, a motion-axis component having the largest absolute value in the determined motion-axis components, the cutting-engaged angle and a motion direction angle.

7. A control method according to claim 5, wherein said step of determining the cutting force component in the direction tangential to tool motion and/or the cutting force component in the direction normal to tool motion comprises:
   determining a primary component of a cutting force in a direction tangential to a spindle rotation direction based on the current value of the spindle motor;
   determining a motion-axis component of the cutting force in a motion-axis direction based on a current value of a motion-axis motor of a motion axis for which a motion amount per predetermined time is the largest; and
   obtaining the cutting force component tangential to tool motion and/or the cutting force component normal to tool motion using the determined primary component, the motion-axis component, the cutting-engaged angle and a motion direction angle.

8. A control method according to claim 5, wherein said step of determining the cutting force component in the direction tangential to tool motion and/or the cutting force component in the direction normal to tool motion comprises:
   determining a primary component of a cutting force in a direction tangential to spindle rotation based on the current value of the spindle motor;
   determining motion-axis components of the cutting force based on the current values of the motion-axis motors;

determining the cutting force component in the direction tangential to tool motion based on the determined motion-axis components and a motion direction angle; and determining the cutting force component in the direction normal to tool motion based on the determined cutting force component tangential to tool motion, the determined primary component and the cutting-engaged angle.

9. A control method for controlling machining by an end mill tool, comprising the steps of:

detecting a current value of a spindle motor and current values of motion-axis motors for cutting feed;

determining a cutting force component in a direction normal to tool motion using the detected current values of the spindle motor and the motion-axis motors, and a radius and a cutting-engaged angle of the end mill tool; and controlling feed speed and/or spindle speed such that the determined cutting force component normal to tool motion is not greater than a predetermined value.

10. A control method for controlling machining by an end mill tool, comprising the steps of:

detecting a current value of a spindle motor and current values of motion-axis motors for cutting feed;

determining a cutting force component in a direction tangential to tool motion using the detected current values of the spindle motor and the motion-axis motors, and a radius and a cutting-engaged angle of the end mill tool; and controlling feed speed and/or spindle speed such that the determined cutting force component tangential to tool motion is not greater than a predetermined value.

11. A control apparatus for controlling machining by an end-mill tool, comprising:

means for detecting a current value of a spindle motor;

means for determining a primary component of a cutting force in a direction tangential to spindle rotation based on the detected current value of the spindle motor and a radius of the end-mill tool;

means for detecting current values of motion-axis motors for cutting feed;

means for determining motion-axis components of the cutting force in motion-axis directions based on the detected current values of the motion-axis motors;

means for calculating a cutting-engaged angle based on the tool radius and a depth of cut or for storing a preset cutting-engaged angle;

means for calculating a motion direction angle based on motion amounts for the motion-axis motors; and means for determining a cutting force component in a direction tangential to tool motion and/or a cutting force component in a direction normal to tool motion based on the primary component, the motion-axis components, the cutting-engaged angle and the motion direction angle.

12. A control apparatus according to claim 11, wherein said means for determining the cutting force component in the direction normal to tool motion and/or the cutting force component in the direction tangential to tool motion determines the cutting force component in the direction tangential to tool motion and/or the cutting force component in the direction normal to tool motion using the primary component, a motion-axis component having the largest absolute value in the determined motion-axis components, the cutting-engaged angle and the motion direction angle.

13. A control apparatus according to claim 11, wherein said means for determining the cutting force component in the direction normal to tool motion and/or the cutting force component in the direction tangential to tool motion determines the cutting force component in the direction tangential to tool motion and/or the cutting force component in the direction normal to tool motion using the primary component, a motion-axis component in the direction of the motion axis for which a motion amount per predetermined time is the largest, the cutting-engaged angle and the motion direction angle.

14. A control apparatus according to claim 11, wherein said means for determining the cutting force component in the direction normal to tool motion and/or the cutting force component in the direction tangential to tool motion determines the cutting force component in the direction tangential to tool motion based on the motion-axis components and the motion direction angle, and determines the cutting force component in the direction normal to tool motion based on the cutting force component in the direction tangential to tool motion, the primary component and the cutting-engaged angle.

15. A control apparatus for controlling machining by an end-mill tool, comprising:

means for detecting a current value of a spindle motor;

means for determining a primary component of a cutting force in a direction tangential to spindle rotation based on the detected current value of the spindle motor and a radius of the end-mill tool;

means for detecting current values of motion-axis motors for cutting feed;

means for determining motion-axis components of the cutting force in motion-axis directions based on the detected current values of the motion-axis motors;

means for calculating a cutting-engaged angle based on the tool radius and a depth of cut or for storing a preset cutting-engaged angle;

means for calculating a motion direction angle based on motion amounts for the motion-axis motors;

means for determining a cutting force component in a direction tangential to tool motion and a cutting force component in a direction normal to tool motion based on the primary component, the motion-axis components, the cutting-engaged angle and the motion direction angle;

means for combining the cutting force component in the direction tangential to tool motion and the cutting force component in a direction normal to tool motion to obtain a resultant cutting force; and means for controlling feed speed and/or spindle speed such that the resultant cutting force is not greater than a predetermined value.

16. A control apparatus for controlling machining by an end-mill tool, comprising:

means for detecting a current value of a spindle motor;

means for determining a primary component of a cutting force in a direction tangential to spindle rotation based on the detected current value of the spindle motor and a radius of the end-mill tool;

means for detecting current values of motion axis motors;

means for determining motion-axis components of the cutting force in motion-axis directions based on the detected current values of the motion-axis motors;

means for calculating a cutting-engaged angle based on the tool radius and a depth of cut or for storing a preset cutting-engaged angle;

means for calculating a motion direction angle based on a motion amount in a motion axis for cutting feed; and means for determining a cutting force component in a direction normal to tool motion based on the primary component, the motion-axis components, the cutting-engaged angle and the motion direction angle; and means for controlling feed speed and/or spindle speed such that the cutting force component in the direction normal to tool motion is not greater than a predetermined value.

17. A control apparatus for controlling machining by an end-mill tool, comprising:

means for detecting a current value of a spindle motor;

means for determining a primary component of a cutting force in a direction tangential to spindle rotation based on the detected current value of the spindle motor and a radius of the end-mill tool;

means for detecting current values of motion axis motors;

means for determining motion-axis components of the cutting force in motion-axis directions based on the detected current values of the motion-axis motors;

means for calculating a cutting-engaged angle based on the tool radius and a depth of cut or for storing a preset cutting-engaged angle;

means for calculating a motion direction angle based on a motion amount in a motion axis for cutting feed; and means for determining a cutting force component in a direction tangential to tool motion based on the primary component, the motion-axis components, the cutting-engaged angle and the motion direction angle; and means for controlling feed speed and/or spindle speed such that the cutting force in the direction tangential to tool motion is not greater than a predetermined value.

* * * * *

UNITED STATES PATENT AND TRADEMARK OFFICE
CERTIFICATE OF CORRECTION

| | |
|---|---|
| PATENT NO. | : 7,101,126 B2 |
| APPLICATION NO. | : 10/834372 |
| DATED | : September 5, 2006 |
| INVENTOR(S) | : Yoshiaki Kakino et al. |

It is certified that error appears in the above-identified patent and that said Letters Patent is hereby corrected as shown below:

Column 1, Line 20, change "ate" to --are--.

Column 10, Line 5, change "display/MI" to --display/MDI--.

Column 11, Line 22, after "(Step 102)" insert --.--.

Column 11, Line 24, "(y=ß- {(π/2)- ßen)" to --(y= ß - {(π/2)- *a*en)"--

Column 11, Line 40, change "R." to --R,--.

Signed and Sealed this

Seventh Day of August, 2007

JON W. DUDAS
*Director of the United States Patent and Trademark Office*